(12) United States Patent
Gitter et al.

(10) Patent No.: US 9,089,918 B2
(45) Date of Patent: Jul. 28, 2015

(54) WELDING GROUND CONNECTION SYSTEM AND METHOD

(75) Inventors: Joseph Carl Gitter, New London, WI (US); George Harold Baus, Kimberly, WI (US); Anthony Van Bergen Salsich, Appleton, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 779 days.

(21) Appl. No.: 13/208,078

(22) Filed: Aug. 11, 2011

(65) Prior Publication Data

US 2012/0152910 A1 Jun. 21, 2012

Related U.S. Application Data

(60) Provisional application No. 61/423,882, filed on Dec. 16, 2010.

(51) Int. Cl.
*B23K 9/028* (2006.01)
*B23K 9/173* (2006.01)
*B23K 9/32* (2006.01)
*B23K 37/00* (2006.01)

(52) U.S. Cl.
CPC .............. *B23K 9/0282* (2013.01); *B23K 9/173* (2013.01); *B23K 9/32* (2013.01); *B23K 37/006* (2013.01); *B23K 2201/06* (2013.01)

(58) Field of Classification Search
CPC .. B23K 9/0956; B23K 9/0953; B23K 9/1006; B23K 9/1043
USPC .......................................... 219/130.01–130.5
See application file for complete search history.

(56) References Cited

U.S. PATENT DOCUMENTS

| 3,860,785 | A * | 1/1975 | Wittman ....................... 219/136 |
| 7,170,031 | B2 * | 1/2007 | Goodwin ................. 219/130.21 |
| 2003/0043516 | A1 | 3/2003 | Ahlstrom et al. |
| 2005/0178754 | A1 | 8/2005 | Goodwin |
| 2007/0080153 | A1 * | 4/2007 | Albrecht et al. ......... 219/130.01 |

FOREIGN PATENT DOCUMENTS

JP 50133951 A 10/1975
(Continued)

OTHER PUBLICATIONS

International Search Report & Written Opinion of PCT/US2011/064910 mailed Apr. 2, 2012.

*Primary Examiner* — Tu B Hoang
*Assistant Examiner* — Thomas Ward
(74) *Attorney, Agent, or Firm* — Fletcher Yoder P.C.

(57) ABSTRACT

A grounding system is provided for welding applications. The system comprises a pair of contacts that are brought into close grounding contact with a workpiece, and a measurement circuit coupled to the contacts. The contacts may be urged into intimate contact with the workpiece by a biasing structure that pulls the contacts tightly against the workpiece. The measurement circuit may include a center-tap transformer having a secondary coupled to a ground lead and to the contacts. A primary winding of the transformer is coupled to an oscillator that executes a measurement test. The system may provide an indication of the quality of the ground in the form of an operator perceptible notification, a digitized value, or any other suitable form.

7 Claims, 2 Drawing Sheets

(56) References Cited

FOREIGN PATENT DOCUMENTS

| JP | 60133976 | A | 7/1985 |
| JP | 2001353580 | | 12/2001 |
| JP | 2005324232 | | 11/2005 |
| JP | 2009045648 | A | 3/2009 |

* cited by examiner

WELDING GROUND CONNECTION SYSTEM AND METHOD

BACKGROUND

The invention relates generally to welding systems, and more particularly to improved grounding connections for pipe welding and other welding applications.

An essential part of welding practice is properly grounding the workpiece. This ensures that the workpiece is at or very near the same potential as a ground terminal of a power supply so that a circuit can be completed through the workpiece to establish and maintain a welding arc. Consequently, a primary source of compromised welds is faulty ground connection to the workpiece. Traditionally, grounding is done through a work clamp that clamps onto the workpiece (or a fixture to which the workpiece is mounted) and which is grounded through a cable extending back to a welding power supply. However, work clamps are only suitable for workpieces of limited size and shape, such as those with straight or flat sides and of manageable size. However, using work clamps is unfeasible for pipe welding, or for other unwieldy shapes due to limited contact areas (e.g., where two joints of pipe are closely positioned end-to-end). Unfortunately, commonly used grounding techniques for pipe welding are to insert a grounding device into the gap between the two pipe joints or to place a grounding device on top of the two pipe joints, often being secured only through gravity. These grounding devices may just be pieces or blocks of conductive material, most of which are not specifically designed for the function of creating a good ground connection. The existing grounding techniques establish fragile contact angles that only touch a small surface of the workpiece. These weak connections result in a higher level of resistance as current is restricted, which can weaken the integrity of the weld and cause defects.

Additionally, the existing grounding techniques do not include a convenient means of measuring critical parameters such as current, voltage, and resistance, which can be used to verify an acceptable connection. This is an important function because the point of grounding contact on the workpiece may not always provide a sufficiently conductive surface. It is not uncommon for the workpiece to be corroded or soiled at the point of contact with the ground connection, preventing a solid ground connection. For example, there may be rust or other nonconductive debris between the conductive material of the workpiece and the grounding device. The result is a faulty or high resistance ground connection, potentially compromising the quality of the weld. Without a means of measuring and indicating ground connection quality, the operator has no knowledge of the poor connection and therefore may continue to weld with a faulty ground connection. A lack of feedback makes it difficult or impossible to detect and correct a poor ground connection. This is especially problematic in advanced process equipment as the current flow is precisely controlled to achieve optimal results.

There is a need for an improved grounding device that is capable of establishing a robust grounding connection as well as a means to verify that connection.

BRIEF DESCRIPTION

The present disclosure summarizes a newly developed welding ground connection system and method that fulfills these needs. The system involves a grounding device with which the workpiece is grounded via two conductive prongs with a centertap ground lead.

In accordance with one aspect of the present disclosure, a welding ground connection system and method make use of prongs that may be forced into intimate contact with one or more workpieces, and which also function as sensor leads. The prongs are coupled to an electronic circuit capable of having a user interface, taking characteristic measurements, outputting indications, and any combination of these, as well as other functions that may be desired.

In accordance with further aspects of the present disclosure, a grounding system body is secured to the workpiece by a magnet, though it can also by secured through other means of fastening the grounding system to the workpiece. A two pronged connection is created, which is ensured by the securely fastened body, significantly increasing the quality of the ground connection in comparison to existing solutions. Furthermore, the present disclosure discloses a method for grounding a workpiece while simultaneously taking and outputting measurements indicative of the quality of the ground.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
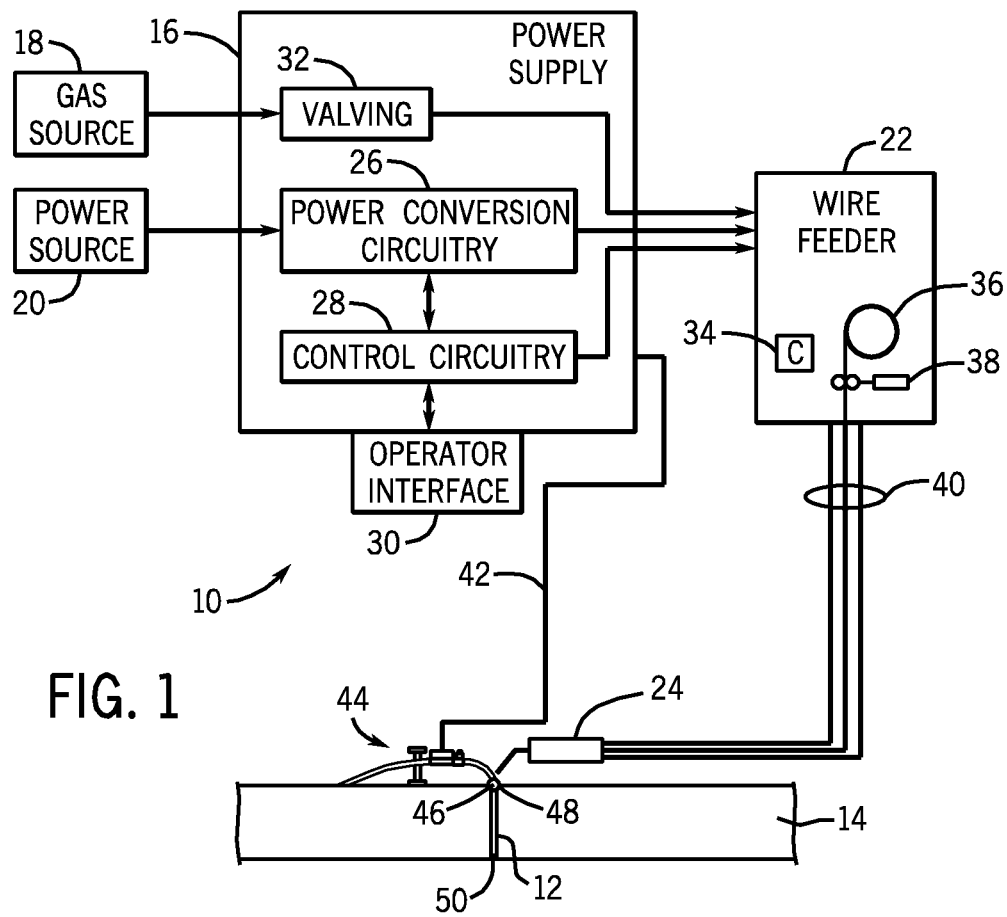
FIG. 1 is a diagrammatical representation of an exemplary welding system utilizing aspects of the disclosed welding ground connection system.

FIG. 1 illustrates an exemplary welding system 10 utilizing the disclosed welding ground connection system. The system 10 is designed to produce a weld 12 on a workpiece 14. The system includes a power supply 16 that will typically be coupled to a gas source 18 and to a power source 20, such as the power grid, although generators, engine-driven power packs, batteries, and so forth may all serve as power sources, particularly in more remote welding locations. A wire feeder 22 is coupled to the power supply 16 and supplies welding wire, shielding gas from the gas source, and welding power from the power supply to a welding gun 24. In the illustrated embodiment, the power supply 16 will include power conversion circuitry 26 coupled to control circuitry 28 that regulates operation of the power conversion circuitry to produce power output suitable for the welding operation. The power supply may be designed and programmed to produce output power in accordance with a number of processes, welding regimes, and so forth, including constant current processes, constant voltage processes, pulsed processes short circuit transfer processes, and so forth. The power supply may also include valving 32 for regulating the flow of shielding gas from the gas source 18. In the presently contemplated embodiment, an operator interface 30 allows a welding operator to alter both the welding process and the process settings. The power supply 16 also provides a ground terminal for a ground connection 42 of the grounding assembly 44.

It should be noted that, while throughout the present discussion reference is made to a "ground" connection, this term should be understood generally to include a work connection at any desired potential. As will be appreciated by those skilled in the art, welding processes may call for positive or negative designations for the electrode and workpiece, although in all processes intended to be used with the present grounding techniques, a workpiece connection will be made, and advantageously with the systems and methods described.

The wire feeder 22 typically includes control circuitry 34, which regulates the feed of welding wire from a spool 36. The spool 36 contains welding wire, which serves as the electrode for the welding process and is advanced into the torch 24 by a drive assembly 38. Welding wire, gas, and power are provided to the torch 24 via a weld cable 40.

Figure 2:
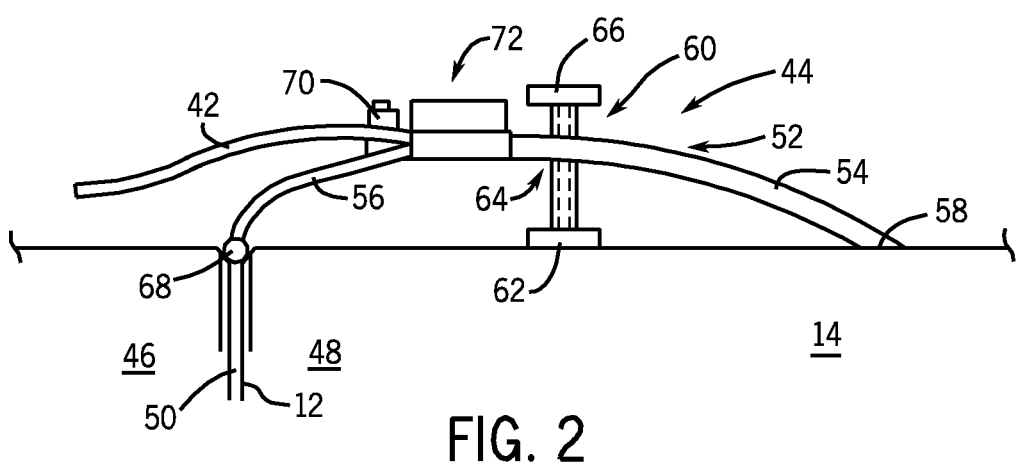
FIG. 2 is a detailed side view of the disclosed welding ground connection system for use with the welding system.
Figure 3:
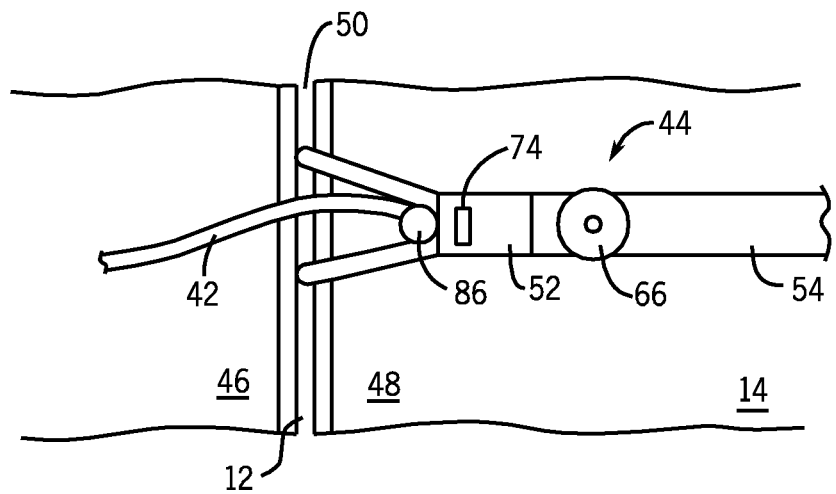
FIG. 3 is a detailed top view of the disclosed welding ground connection system for use with the welding system.

FIG. 2 and FIG. 3 show an exemplary grounding assembly 44 in relation to the workpiece in this embodiment. In the illustrated embodiment, the workpiece comprises two end-to-end positioned joints of pipe forming a first side 46 and a second side 48 separated by a gap 50 wherein a weld is to be formed. Typically, a gap 50 is left between the first side 46 and the second side 48 to allow full penetration of welding material, though a gap 50 is not necessary in order to use the grounding assembly 44. The joint 12 may be configured in many different ways, with the ends of side 46 and side 48 having different configurations, including but not limited to a bevel as shown in FIG. 2.

In the illustrated embodiment, the grounding assembly 44 comprises a body 52, a non-conductive extension 54, and prongs 56, with the non-conductive extension 54 forming a downward arching shape and making contact with the workpiece 14 at a rear bearing 58. The non-conductive extension 54 can be made of non-conductive materials of various compositions, and can be configured in many different forms as needed. The purpose of the non-conductive extension 54 is to stabilize the grounding assembly 44 about the workpiece 14. Though the present embodiment illustrates the non-conductive extension 54 as having a long rectangular shape extending away from the prongs 56 in a downward arching configuration, it could have a number of different shapes and sizes and be oriented about the workpiece 14 in different ways. Utilizing the non-conductive extension 54 is one means of stabilizing the grounding assembly 44 about the workpiece 14 among others. There may be some embodiments where the nonconductive extension 54 is not used, but the prongs or contact structure is urged into engagement with workpiece by other means (e.g., a strap, a weight, etc.).

In the present embodiment, the grounding assembly 44 includes a compression assembly 60, which compromises a magnet 62, an adjustment assembly 64, and a knob 66, wherein the knob 66 is coupled to the adjustment assembly 64, and the adjustment assembly 64 is coupled to the magnet 62 on the opposing end as more effectively illustrated in FIG. 2. The magnet 62 is generally in stable magnetic contact with the surface of the workpiece 14. The purpose of the compression assembly 60 is to secure the grounding assembly onto the workpiece 14, specifically to ensure that the grounding assembly 44 is in robust conductive contact with the workpiece. The purpose of the adjustment assembly 64 is to raise, lower, or otherwise move the grounding assembly 44 with respect to the workpiece 14 so that the grounding assembly 44 is properly secured to the workpiece and in reliable electrical contact with the workpiece. In this embodiment, the compression assembly 60 is generally perpendicularly integrated into the body 52 as illustrated in FIG. 2. The compression assembly 60 and the body 52 are generally fixed at their intersection. Specifically, the adjustment assembly 64 may contain threads such that the body 52 may be pulled displaced by the threads as the knob 66 is turned, moving the body either up or down the adjustment assembly, effectively determining the vertical location of the body 52 and the contact force of the grounding assembly 44 on the workpiece 14 (the entire assembly acting as a beam that exerts an increased contact force on the workpiece as the body is moved downwardly). As noted above, while the compression assembly 60 in this embodiment utilizes a magnet 62 and knob 66 mechanism, other means of attaching or holding the grounding assembly 44 in place relative to the workpiece 14 may be used in some other embodiments. These include but are not limited to other supports, clamps, wraps, human operators, external means of support, and so forth. The present configuration, including the compression assembly 60 and non-conductive extension 54, is one embodiment of many different reasonable configurations that preserve the essence of the present invention.

As illustrated in FIG. 2 and the present embodiment, the prongs 56 are coupled to the body 52 of the grounding assembly 44, and comprise tips 68 as shown. The prongs can be configured in various forms, including a wide range of shapes and sizes. The prongs 56 may be a separate part attached to the body 52 through various attachment methods, or they may be manufactured as one piece with the body 52. FIG. 3 illustrates the present embodiment as having two prongs. However, in some embodiments, there may only be one prong 56 present, while some embodiments may utilize two or more prongs 56. Additionally, one or more embodiments may comprise a grounding assembly 44 with one or a plurality of prongs 56 receptacles on the body 52, such that the operator can define how many prongs 56 are to be used by attaching or detaching prongs from the prong receptacles. For example, if an operator requires only one prong, the operator may detach all prongs 56 except for one so that the other prongs are not in the way. Conversely, if an operator is welding a large or oddly shaped workpiece 14, the operator may attach a plurality of prongs 56 to ensure a solid ground. In embodiments where a plurality of prongs 56 is utilized, the prongs 56 may or may not be identical. However, in the presently contemplated embodiment, these of two prongs, or more generally, two grounding contacts, allows for measurement and indication of the quality of the ground, as discussed below.

The prongs 56 direct the tips 68 to the desired grounding point on the workpiece 14, generally but not necessarily being the joint 12. Accordingly, in some embodiments, the prongs 56 may be absent, wherein the conductive tips 68 are coupled directly to the body 52, bypassing the prongs 56. Alternatively, some embodiments may utilize "tip holders" of shapes and configurations other than the general shape of the prongs 56. The prongs 56 may or may not be made of conductive material, insulated on the outside or not. In the case the prongs 56 are not made of conductive materials, there may be some other conductive path such as a wire or conductive core that runs along the prongs conductively coupling the tips 68 to the body 52 of the grounding assembly 44. The prongs may or may not also be pliable. In applications where two workpieces are spaced from one another in the fit-up of the joint, it will generally be desired to have the contacts of the assembly form a ground with both workpieces such that the welding arc may be maintained as the process progresses between the workpieces.

FIG. 2 shows the tips 68 being in intimate contact with the workpiece 14 at the joint 12, coupling the workpiece 14 with ground. The tips 68 are configured so that they can be well-situated on the joint 12 or elsewhere on the workpiece 14, establishing a stable ground connection. In order to accommodate joints 12 and workpieces 14 of different configurations, the tips 68 may be configured in different shapes, sizes, from different materials, and so forth. Additionally, the tips 68 may also be removable and interchangeable with respect to the prongs 56 to accommodate different joint 12 configurations. The tip 68 can also be easily removed from the prongs 56 and discarded if damaged or worn without needing to replace the entire grounding assembly 44. When used, the tip 68 may be made removable and interchangeable through various means of attachment to the prongs 56, such as but not limited to having threads, magnets, snapping mechanisms, and various other attachment methods.

The tips 68, being in contact with the workpiece, ground the workpiece 14 via a ground cable 42. The ground cable 42 is conductively coupled to the prongs 56 at the base or terminal 70. This completes a grounding circuit through the workpiece 14, the ground cable 42, and the ground terminal of the power supply 16 of the welding system 10. In some embodiments, the ground lead 56 of the grounding assembly can be configured to also contain a communication cable so that data can be transmitted and received between the grounding assembly and the power supply 10. Additional forms of communication are possible such as through communication lines elsewhere on the grounding assembly 44 or via Bluetooth, and so forth. The data may be sent and received from the power supply 10 as shown in FIG. 1 or some other type of processing unit such as but not limited to a computer.

Figure 4:
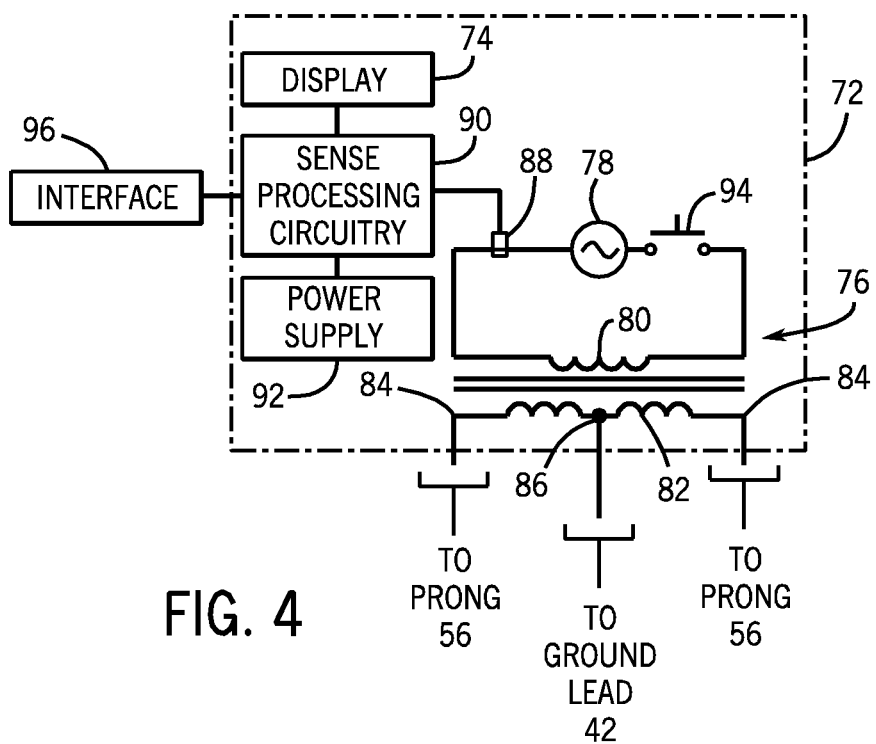
FIG. 4 is a diagrammatical representation of the electronic circuitry of the disclosed welding ground connection system.

In addition to providing a secure grounding method, the grounding assembly 44 also provides a means of sensing characteristic measurements, including but not limited to some indication of the quality of the ground connection. FIG. 4 diagrammatically illustrates the sensing and indication circuit 72 of one embodiment, which comprises an indication module 74, and a transformer circuit 76, the transformer circuit comprising an oscillator 78, a primary winding 80, and a set of secondary windings 82. In the particular embodiment shown, the oscillator 78 is coupled to the transformer 76 which features a primary winding 80 and a pair of secondary windings 82. The secondary windings 82 each comprises one end 84 which is coupled to the prongs 56. The secondary windings 82 are connected to each other on the sides opposite the ends 84 which are coupled to the prongs. The junction of the two secondary windings 82 is also the centertap ground cable terminal 86 as more clearly shown in FIG. 4. At the centertap ground cable terminal 86, the ground cable 42 is coupled to the ends 84 of the transformer circuit 76, thus grounding the workpiece via the prongs 56 and tips 68. Additionally, the ends 84 also act as sensor leads going to the prongs 56 of the grounding assembly 44 where they are conductively coupled to the tips 68 and the workpiece 14. In the present embodiment, the two tips, tip 1 68 and tip 2 68 now function as the sensor leads. A measurement circuit is completed through the workpiece 14 as current flows from the centertap transformer 76 to one tip 68, through the workpiece 14 to the other tip 68, and then back into the centertap transformer 76. The signal then passes through a sensor 88 which feeds the measurement data to a processing circuit 90, where measured data is stored and processed.

The processing circuit 90 can be configured in many different ways in accordance with a wide range of possible functions as known to one skilled in the art. The processing circuit 90 may carry out tasks such as calibrating and digitizing sensor values, storing data, and controlling the indication module 74. The processing circuit 90 is coupled to a power supply 92, which may be a battery, capacitor, or some other appropriate power source to drive the power consuming components of the circuit, Additionally, there may also be an indication module 74 coupled to the processing circuit 90. The indication module 74 may be configured to output readouts, sounds, lights, any combination of these and other types of output indication signals. These indications may give a direct numerical representation of the measurements, in which case the operator will know how to interpret the numerical representation with respect to quality of ground. In other embodiments, the indication 74 in conjunction with the processing circuit 90 may be preprogrammed so that it references the measured value with threshold values, effectively making a decision about the quality of the ground and outputting a qualitative indication of the quality of the ground connection or other parameters. For example, there may be a green LED, a yellow LED, and a red LED such that the green LED lights up when a solid ground connection has been made, the yellow LED lights up when an unstable ground connection is detected, and the red LED lights up when the ground connection is absent. In some embodiments, there may only be two degrees of ground quality: present or absent. The processing and indication function may not always need to be used and is not necessary for the grounding function of the grounding assembly 44. Additionally, as mentioned above, the type and degree of indication may be configured to meet a wide range of desired functions and formats. Some embodiments may include a push to test button 94 coupled to the measurement circuit to turn the function on and off.

The processing circuit 90 may also be coupled to an input controls interface 96 in some embodiments. The interface 96 allows the operator to select different functions and indication types. For example, the operator may want to see data from a previous measurement or turn an alarm on or off. Accordingly, the interface may include controls such as but not limited to buttons, touchscreens, knobs, keypads, and any combination of these and other types of existing or new input controls. The physical location of the output signals and input controls can be in various locations on the grounding assembly 44.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A grounding system for welding application, comprising:
   an input configured to connect to a ground lead of a welding system;
   a first grounding arm and a second grounding arm configured to electrically couple to the input and connect to a welding workpiece;
   means for urging the first and second grounding arms into contact with the workpiece;
   a transformer circuit comprising:
      a centertap transformer having a primary winding, a first secondary winding, a second secondary winding, and a center tap output, wherein the first secondary winding and the second secondary winding are electrically coupled to one another at the center tap output; and
      an oscillator electrically coupled to the centertap transformer;
   a measurement circuit coupled to the transformer circuit and configured to determine a quality of a ground established by the first and second grounding arms on the workpiece; and
   an indicator coupled to the measurement circuit and configured to provide an operator perceptible indication of the quality of the ground;

wherein the first secondary winding is coupled to the first grounding arm and the second secondary winding is coupled to the second grounding arm; and wherein the input is electrically coupled to the center tap output of the centertap transformer.

2. The system of claim 1, wherein the grounding arms are prong shaped with contact tips of varying configurations, for establishing robust contact with the welding workpiece.

3. The system of claim 1, wherein the means for urging comprises a magnet for adhering to the system to the workpiece.

4. The system of claim 1, wherein the measurement circuit measures a parameter indicative of resistance, and wherein the indicator indicates a parameter indicative of quality of ground based upon measured resistance.

5. The system of claim 4, wherein the parameter indicative of resistance measured by the measurement circuit is processed by a processor and outputted as a value indicative of the quality of ground.

6. The system of claim 1, wherein the measurement circuit comprises a sensor electrically coupled to the centertap transformer and sense processing circuitry configured to receive measurement data from the sensor and to determine the quality of the ground based on the measurement data.

7. The system of claim 1, wherein the transformer circuit comprises a button electrically coupled to the oscillator and the centertap transformer and configured to enable and disable the measurement circuit.

\* \* \* \* \*